Nov. 3, 1959          J. O. EWING          2,910,838
TEMPERATURE CONTROL SYSTEM FOR SOLUTION TANKS
Filed March 5, 1956          5 Sheets-Sheet 1
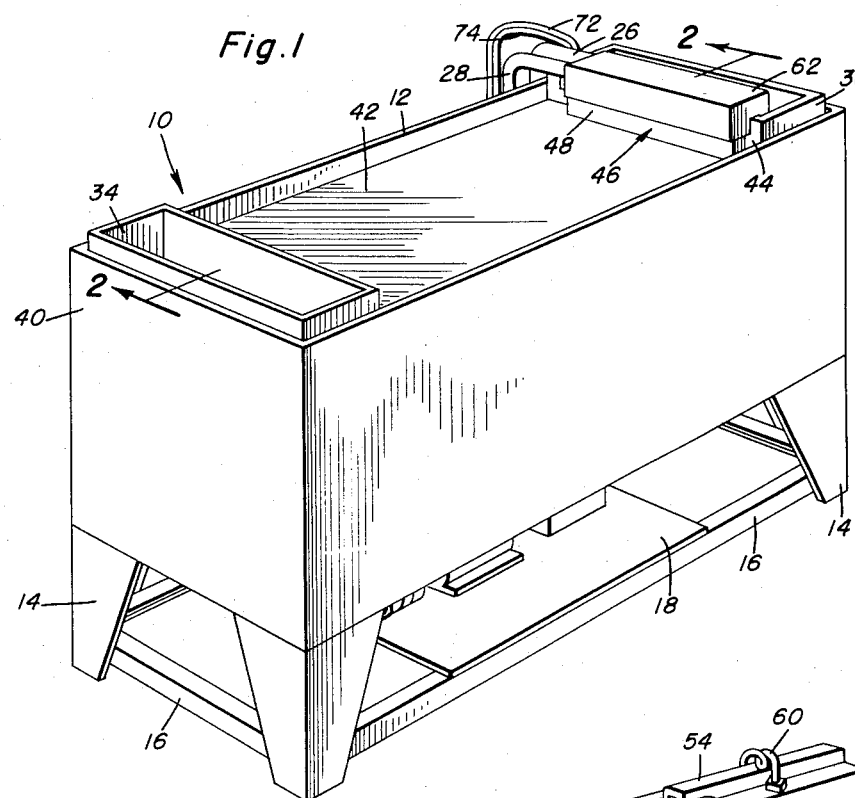
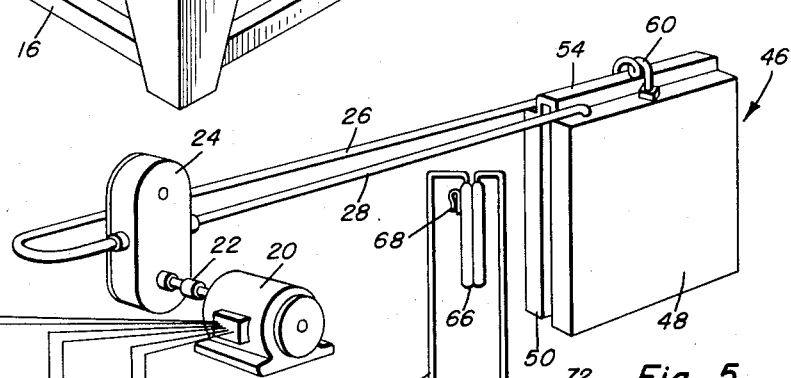
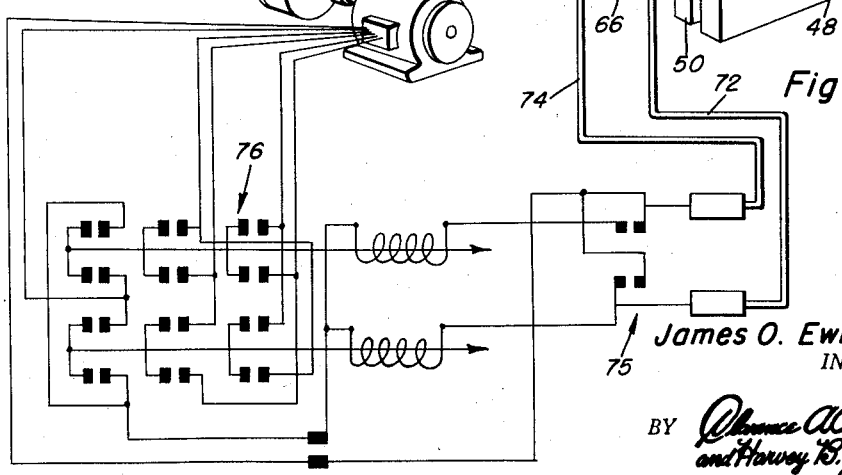
James O. Ewing
INVENTOR.

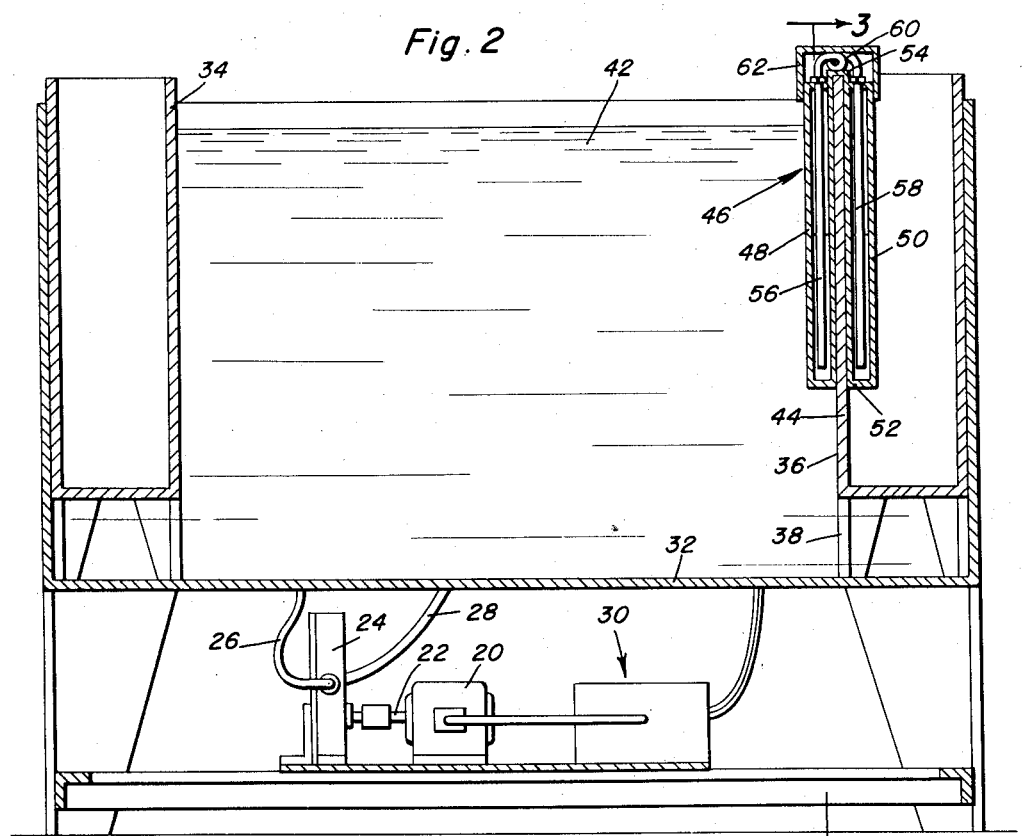
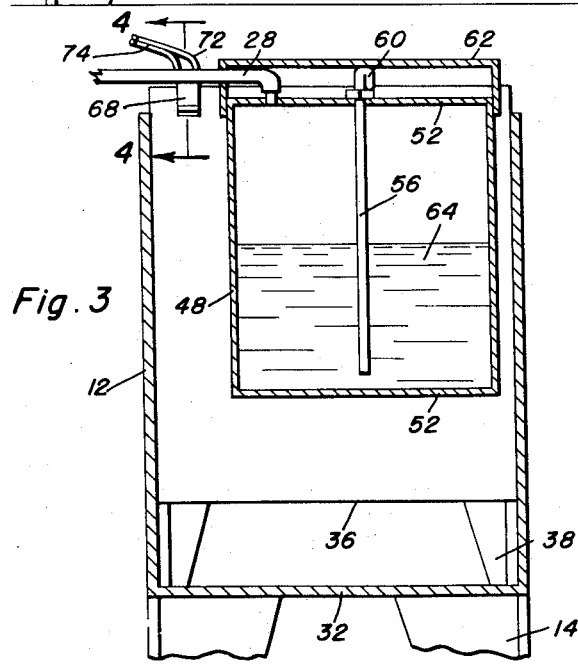
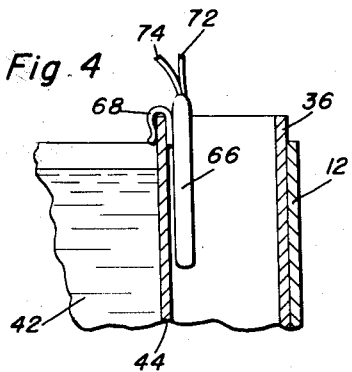
James O. Ewing
INVENTOR.

Nov. 3, 1959          J. O. EWING          2,910,838

TEMPERATURE CONTROL SYSTEM FOR SOLUTION TANKS

Filed March 5, 1956          5 Sheets-Sheet 3

James O. Ewing
INVENTOR.

Nov. 3, 1959
J. O. EWING
2,910,838
TEMPERATURE CONTROL SYSTEM FOR SOLUTION TANKS
Filed March 5, 1956
5 Sheets-Sheet 4
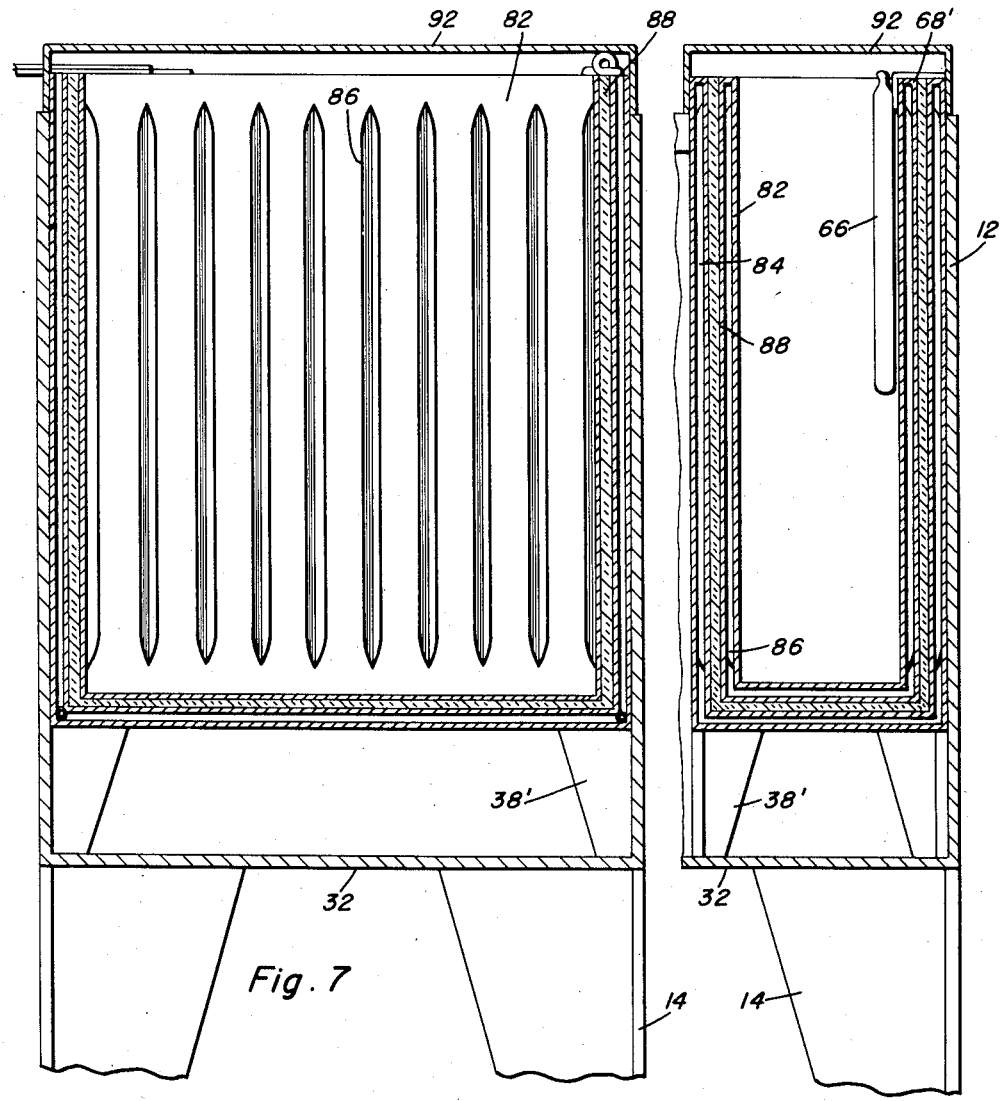
Fig. 7
Fig. 8
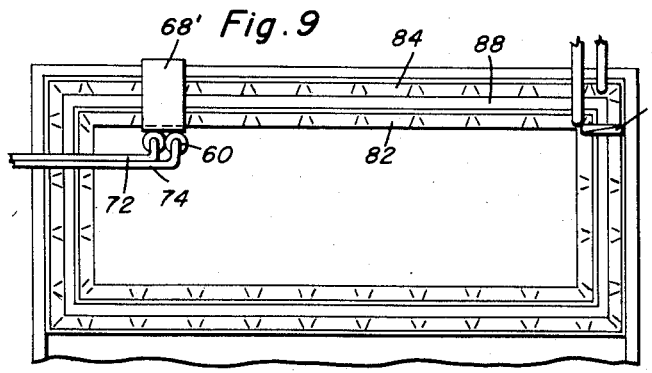
Fig. 9
James O. Ewing
INVENTOR.
BY Clarence A. O'Brien
and Harvey B. Jacobson
Attorneys Nov. 3, 1959 J. O. EWING 2,910,838
TEMPERATURE CONTROL SYSTEM FOR SOLUTION TANKS
Filed March 5, 1956 5 Sheets-Sheet 5
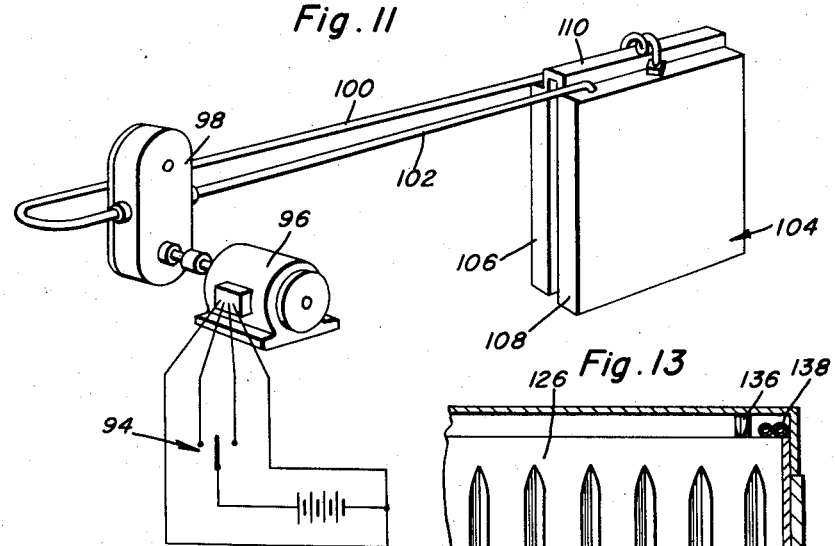
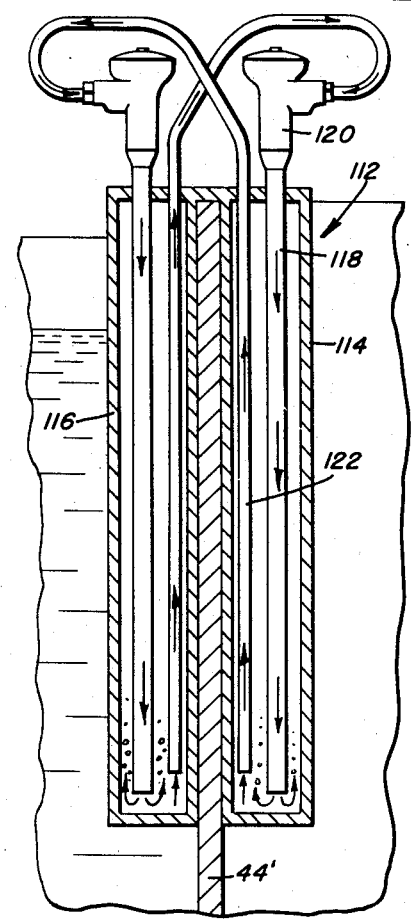
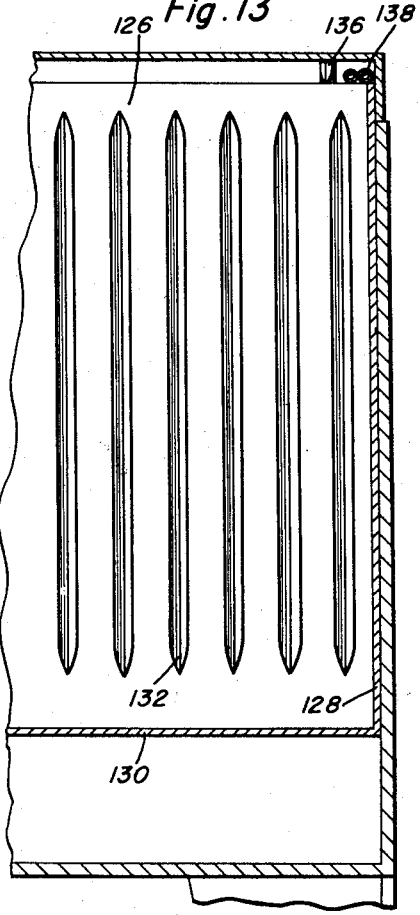
James O. Ewing
INVENTOR.

ction with the end walls of the tank 12. The tanks 34 and 36 are provided with inturned flanges 40 at the upper edges thereof for engagement with the upper edges of the end walls and side walls of the tank 12 for supporting the tanks 34 and 36 in position. The insert tanks 34 and 36 are adapted to receive solutions of chemicals or liquids normally employed in photographic and radiographic arts and it is to be understood that any number of insert tanks may be employed.

United States Patent Office

2,910,838
Patented Nov. 3, 1959

2,910,838

TEMPERATURE CONTROL SYSTEM FOR SOLUTION TANKS

James O. Ewing, Nashville, Tenn.

Application March 5, 1956, Serial No. 569,527

11 Claims. (Cl. 62—160)

This invention generally relates to a temperature control system and more specifically provides an apparatus for retaining a solution at a predetermined temperature irrespective of atmospheric temperatures.

An object of the present invention is to provide a temperature control apparatus especially adapted for use in retaining the solutions of chemicals or liquids normally employed in the photographic and radiographic arts at a predetermined temperature which is necessary for the most effective use of such solutions.

Generally, solutions of chemicals or liquids are employed in the photographic and radiographic arts and are contained in molded insert tanks of hard rubber or the like and these insert tanks are immersed in a water bath. It is extremely desirable to maintain the temperature of such solutions at a selected level of approximately 68° Fahrenheit for satisfactory film development and processing. Previously, the temperature of the water bath has been controlled by heating or chilling the same and the solution tanks or vats were then immersed in the water bath for retaining the temperature at the desired level. Also, some attempt has been made to provide a constant flow of heated or chilled water around the solution tanks or compartments and direct refrigeration or heating of the walls of the master water tank has been attempted. These methods are expensive, cumbersome and still do not accurately control the temperature of the solution of chemicals in the insert tanks. Accordingly, it is another object of the present invention to provide a temperature control system for a solution tank formed with a master tank including a two-way reversible heat pump together with a combination evaporator and condenser disposed on opposite sides of the separating wall between the solution and the water bath whereby the temperature of the solution may be maintained at the desired level by selectively operating the reversible compressor in the desired direction for either absorbing heat from the solution and giving off heat to the water bath or absorbing heat from the water bath and giving off heat to the solution wherein a thermostatic control is provided which is responsive to the temperature of the solution for operating the reversible compressor in the necessary manner for raising or lowering the temperature of the solution thereby maintaining the solution at a constant temperature.

A further object of the present invention is to provide a temperature control system in accordance with the preceding objects wherein the evaporator and condenser arrangement is an inverted U-shaped member disposed in straddling relation to the dividing or partition wall and being interconnected by a suitable capillary tube or expansion means which is operable regardless of the direction of flow of the refrigerant.

Other objects of the present invention will reside in its simplicity of construction, ease of operation, accuracy of maintaining the solution temperature at the desired level, adaptation for its particular purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the master tank illustrating the temperature control system of the present invention installed therein;

Figure 2 is a longitudinal, vertical sectional view taken substantially upon a plane passing along section line 2—2 of Figure 1 illustrating the relationship of the condenser and evaporator unit together with the control mechanism and the reversible heat pump;

Figure 3 is a vertical sectional view taken substantially upon a plane passing along section line 3—3 of Figure 2 illustrating the details of construction of the evaporator condenser assembly;

Figure 4 is a detailed sectional view taken substantially upon a plane passing along section line 4—4 of Figure 3 illustrating the mounting of the heat bulb for controlling operation of the reversible heat pump in response to the temperature of the solution in the insert tank;

Figure 5 is a schematic view of the temperature control system;

Figure 7 is a transverse, vertical sectional view taken substantially upon a plane passing along section line 7—7 of Figure 6 illustrating the details of construction of the evaporator and condenser assembly employed in this embodiment of the invention;

Figure 8 is a detailed sectional view taken substantially upon a plane passing along section line 8—8 of Figure 6 illustrating further structural details of the evaporator and condenser assembly;

Figure 9 is a top plan view of the evaporator and condenser assembly with the top thereof removed;

Figure 11 is a schematic view of another modified form of temperature control system employing another form of condenser and evaporator assembly;

Figure 12 is a detailed sectional view of the modified form of evaporator and condenser assembly employed in the construction of Figure 11; and Figure 13 is a detailed sectional view of another form of the evaporator and condenser assembly.

Figure 6:
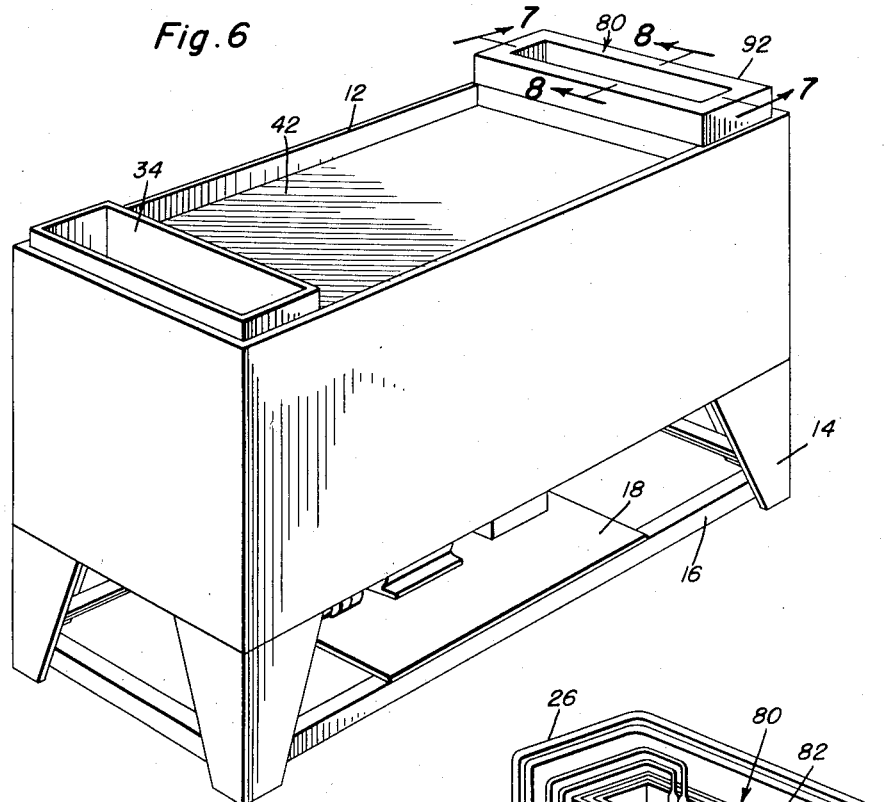
Figure 6 is a perspective view of a modified form of the present invention.

Referring now specifically to Figures 1–5 of the official drawings, it will be noted that the numeral 10 generally designates the temperature control system of the present invention including an enlarged master tank 12 having depending supporting corner legs 14 with horizontally disposed brace members 16 interconnecting the corner legs 14 adjacent the lower ends thereof. Extending transversely between the braces 16 and supported thereon is a supporting plate or base 18 having a reversible electric motor 20 mounted thereon with an output shaft 22 extending therefrom for driving a reversible heat pump 24 having a conduit 26 extending from one side thereof and a conduit 28 extending from the other side thereof with the conduits 26 and 28 alternating as inlets and outlets depending upon the direction of rotation of the output shaft 22 of the motor 20. Also, a control box 30 is provided on the plate 18 for controlling the direction of rotation of the motor 20 and the control box 30 is illustrated diagrammatically in Figure 2.

The tank 12 is provided with a generally horizontally disposed bottom 32 and a pair of insert tanks 34 and 36 are disposed within the tank 12 and each of the tanks 34 and 36 is provided with supporting legs 38 engaging the bottom 32 of the tank 12. The tanks 34 and 36 are disposed at the ends of the tank 12 and in abutting engagement with the end walls 40 thereof. The tank 12 is substantially filled with water 42 whereby the water 42 acts as a heat exchange medium and substantially engages the entire inner wall of the tanks 34 and 36 as well as the bottom wall thereof.

The inner wall of each of the tanks 34 and 36 is designated by the numeral 44 and disposed in straddling relation to the upper edge thereof is an evaporator and condenser assembly generally designated by the numeral 46 which is substantially U-shaped in configuration having hollow leg portions 48 and 50 which are closed at their lower and top ends by plates 52 with a bight portion 54 interconnecting the upper ends of the legs 48 and 50 and engaging the top edge of the wall 4 thereby mounting the evaporator and condenser assembly 46 on the wall 44 with the leg 48 substantially immersed in the water bath 42 and the leg 50 immersed in the solution contained in the tank 36 which may be any solution of chemicals or liquids normally employed in the photographic or radiographic arts.

Extending vertically in the leg 48 is a centrally disposed tubular pipe or conduit 56 and extending vertically in the leg 50 is a centrally disposed tubular pipe 58 both of which extend through the upper closure plates and are interconnected by a capillary tube 60 of generally U-shaped configuration. Disposed over the capillary tube 60 and forming an enclosure for the upper end of the evaporator and condenser assembly 46 is a closure cap 62 which telescopes over the legs 48 and 50.

Connected to the top wall 52 of the leg 48 is the tubular conduit 28 and connected to the other leg 50 of the evaporator and condenser assembly 46 is the tubular conduit 26 whereby refrigerant 64 may be circulated through the system in either direction. A heat bulb 66 is disposed adjacent the inner surface of the tank 36 and is mounted on the wall 44 by a clip 68 and the heat bulb 66 is composed of two elements each of which has a conduit designated by the numerals 72 and 74 connected to thermostatically actuated reversing switches generally designated by the numeral 76 and it is pointed out that the reversing switches 76 and the operation of the thermostats for controlling the same are overlapping to eliminate any possibility of conflict in the motor reversing switch whereby only one set of contacts is in operation at a single time.

Also, it should be pointed out that the heat loss through the plate 44 will be less than the heat gained or lost by the leg portion 50 of the condenser and evaporator assembly 46 whereby the heat pump 24 will always stay ahead of the heat gained or lost through the walls of the solution insert tank 36. Preferably, sufficient refrigerant is injected into the system to an amount necessary to fill each of the two leg portions or plates 48 and 50 7/16 full or in other words a sufficient amount to fill one of the leg portions or plates 7/8 full. This allows either plate or leg portion, when it is acting as a chill plate or evaporator, enough head room to prevent slugging back to the reversible rotary compressor pump which would normally occur if the liquid refrigerant were carried back through the intake conduit. Of course, the motor and pump may be assembled as a single hermetic unit or as separate units as shown. This system permits the use of the water bath as the refrigerant coolant when the processing chemicals are being chilled and vice versa as a heat source when the processing chemicals are being heated. Due to the flexibility of the conduits 26 and 28 and the hairpin shape or U-shape of the condensor and evaporator assembly 46 and the portability of the entire assembly, it may be easily removed for cleaning, replacement or in an application at another point.

In practical operation of the device, it is assumed that the unit has been set up for proper operation and the temperature of the solution in the tank 36 drops below the desired level. The heat bulbs 66 will then actuate the proper switch 76 causing the motor 20 to operate thereby operating the compressor 24. In this instance, the compressor 24 will be operated to discharge pressurized gas into the conduit 26 which discharges into the plate or leg portion 50 within the tank 36 whereby the pressurized refrigerant will be cooled and condensed by the solution thereby adding heat to the solution and bringing the temperature of the solution to the desired point. The capillary tube 60 will permit expansion and reduction in pressure of the pressurized fluid into the plate or leg portion 48 thereby absorbing heat from the water bath 52 after which the gaseous refrigerant will proceed back through conduit 28 to the inlet side of the compressor 24. Inasmuch as there is only sufficient liquid refrigerant to fill the plates or leg portions 48 and 50 to only one-half of their depth or slightly less than one-half, no liquid refrigerant will be propelled back through the intake line 28 thereby eliminating any slugging or liquid hammer caused by a slug of liquid passing through the conduit 28. If the temperature of the solution increases above the desired point, the compressor 24 is operated in the reverse direction wherein pressurized refrigerant is discharged into the tubular plate or leg portion 48 wherein the water bath absorbs heat therefrom and the capillary tube 60 permits expansion and evaporation into the leg portion or plate 50 thereby absorbing heat from the solution in the tank 46 for lowering the temperature thereof.

Accordingly, it will be seen that the present system provides an accurate control for the temperature of the solution in the tank 36 and the interlocking of the reversing switches 76 assures that only one switch 76 will be operative at a single time thereby eliminating any conflict in the electrical circuits.

Figure 10:
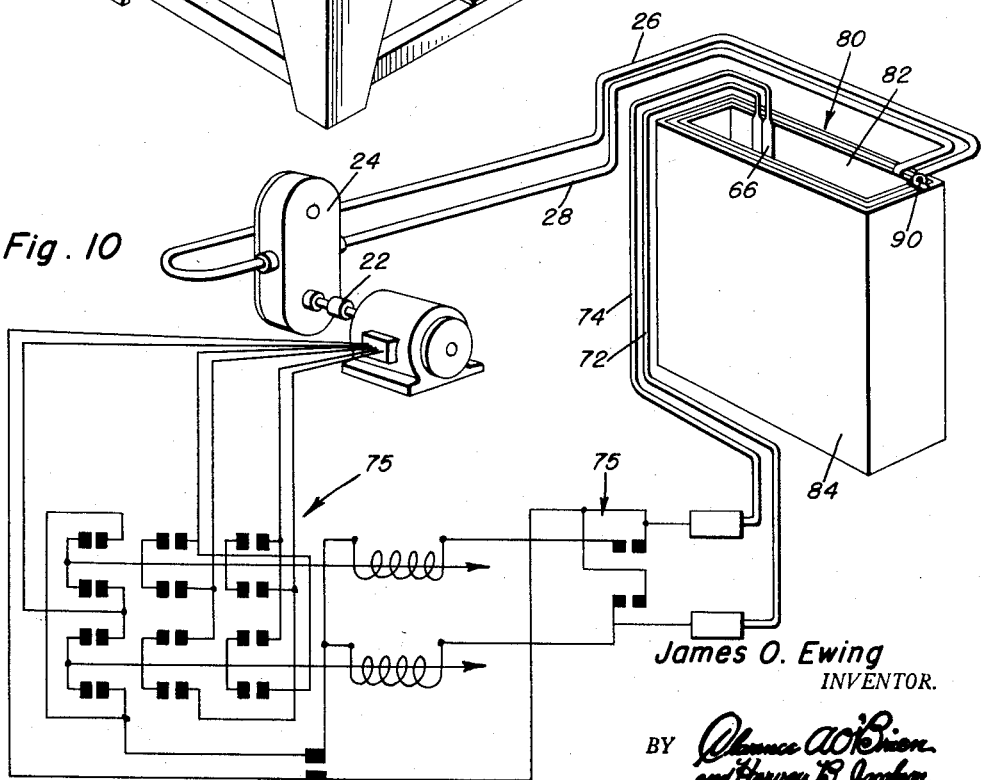
Figure 10 is a schematic view of the temperature control system illustrated in Figures 6–9.

Referring now specifically to Figures 6–10 of the official drawings, it will be seen that the numeral 80 generally designates a modified form of condenser and evaporator assembly and the remainder of the construction is identical to that described in connection with Figures 1–5. The same type of reversible compressor and actuating mechanism therefor is employed and identical reference numerals are employed for designating the same.

In this form of the invention, inner and outer plate coils 82 and 84 which completely encircle the insert tank 36 and each of the plates 82 and 84 is provided with a plurality of vertically disposed embossed tubes 86 which is well known in the refrigeration industry and the plate coil stock 82 and 84 is telescoped within each other with the tank 36 being in the form of an insulator or divider designated by the numeral 88. In actual practice, the inner surface of the inner plate 82 forms a tank and is supported by the supporting legs 38'. The conduit 28 is connected to the inner plate 82 and the conduit 26 is connected to the outer plate 84 and a capillary tube 90 is employed for interconnecting the inner and outer plates 82 and 84 and the termination of the embossed tubes 86 in spaced relation to the top of the plates 82 and 84 provides an expansion head or a drying out area to prevent the refrigerant from passing back to the compressor as a liquid thereby eliminating any slugging that would be caused thereby. The heat tubes or expansion bulbs 66 are mounted on an inverted U-shaped clip 68' which bridges the inner plate 82, the divider 88, the outer plate 84 and the outer wall of the tank 12 thereby assembling the entire unit and retaining the evaporator and condenser assembly 80 in the desired position.

In this form of the invention, the operation is exactly the same and the complete encirclement of the inner and outer plates 82 and 84 permit more effective temperature control and assure that the temperature will be brought more rapidly to the desired level. In other words, a relatively shorter time will elapse from the time the compressor begins running until such time as the temperature is brought to the desired point. This will eliminate any substantial waiting periods that sometimes occur when the proper temperature level is awaited.

As in the form of the invention illustrated in Figures 1–5, the closure cap 92 is provided which is of inverted U-shaped configuration and telescopes over the inner and outer plates 82 and 84 and still permits removal or replacement of the solution within the insert tank formed by the inner wall 82. The operation of the device is substantially the same as that set forth in the description of the form of the invention illustrated in Figures 1–5 wherein the compressor is actuated in selective directions responsive to the temperature of the solution in the solution tank.

Referring now specifically to Figures 11 and 12, it will be seen that a simplified control system may be provided including a manually actuated reversing switch 94 for operation of a reversible motor 96 driving a reversible two-way rotary compressor 98 having fluid conduits 100 and 102 connected thereto which are in turn communicated with an inverted U-shaped evaporator and condenser assembly 104 having a pair of plates or leg portions 106 and 108 interconnected by a bight portion 110 for straddling a tank wall 44'. Each of the leg members or plates 106 and 108 is hollow and may be of a construction similar to that illustrated in Figures 1–5 wherein a manual control switch may be provided for operating the device.

As illustrated in Figure 12, another modified form of condenser and evaporator unit is designated generally by the numeral 112 and includes a pair of hollow plates 114 and 116 with a tubular member 118 extending vertically downwardly through each member 114 and 116 and terminating in spaced relation to the bottom thereof. At the upper end of each tube 118 is an automatic expansion valve 120. Also disposed in the plates 116 and 114 is a tubular member 122 cross-connected to the expansion valve 120 on the opposite plate thereby interconnecting the plates for selective operation as a chilling or evaporating plate or a heating or condensing plate for operation in a similar manner as the other forms of the invention previously described.

The reversing switch 76 receives its signal from dual thermostat 75 which is connected to the dual expansion bulbs 66. The thermostat is a dual close-on-rise and close-on-fall type and is linked to prevent overlapping of the two temperature ranges and thus insure closure of only one set of contacts at a time thereby preventing electrical conflict in the reversing switch 76.

Referring specifically to Figure 13 of the drawings, another form of the evaporator and condenser unit is illustrated and designated generally by the numeral 124 which is similar to the construction illustrated in Figures 7–9 except that the plate coils or manifolds 126 extend only along the side walls of the insert tank with the tank having a flat end plate 128 and a flat bottom plate 130 with only the manifold plate 126 having flutes 132 with the plates 126 being disposed on opposite sides of the insulator plate whereby the insert tank may be inserted into a conventional master tank thereby eliminating the necessity of installing an oversize master tank. The inner and outer plates are interconnected by the usual capillary tubes 136 with a capillary tube interconnecting the plates on each side of the side walls of the insert tank. The ends of the outer plates and the ends of the inner plates are also interconnected by end tubes 138 extending along the top edge of the ends of the insert tank.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a heat exchange system including a solution to be maintained at a constant temperature level and a heat exchange medium for absorbing heat from said solution when the temperature of said solution rises above the desired temperature level and for losing heat to said solution when the temperature of said solution falls below the desired temperature level, a temperature control apparatus comprising condenser means and evaporator means, means intercommunicating said evaporator means and condenser means with the evaporator means being immersed in said solution for controlling the temperature thereof and the condenser means being immersed in said heat exchange medium, refrigerant compressing means, means selectively communicating the pressurized refrigerant from the compressing means with the condenser means and the evaporator means whereby heat is lost from the pressurized refrigerant to said heat exchange medium in the condenser means and heat is absorbed from said solution to the evaporating refrigerant in the evaporator means when the pressurized refrigerant is communicated with the condenser means thereby lowering the temperature of said solution and whereby heat is lost from the pressurized refrigerant to said solution in the evaporator means and heat is absorbed from said heat exchange medium to the evaporating refrigerant in the condenser means when the pressurized refrigerant is communicated with the evaporator means thereby raising the temperature of the solution, said condensing and evaporating means including an inverted U-shaped member of hollow construction having spaced parallel leg portions adapted to be disposed on opposite sides of a partition separating said solution from said heat exchange medium, each of said leg portions having a plurality of heat exchange coils therein thereby forming an evaporator and condenser.

2. In a heat exchange system including a solution to be maintained at a constant temperature level and a heat exchange medium for absorbing heat from said solution when the temperature of said solution rises above the desired temperature level and for losing heat to said solution when the temperature of said solution falls below the desired temperature level, a temperature control apparatus comprising condenser means and evaporator means, means intercommunicating said evaporator means and condenser means with the evaporator means being immersed in said solution for controlling the temperature thereof and the condenser means being immersed in said heat exchange medium, refrigerant compressing means, means selectively communicating the pressurized refrigerant from the compressing means with the condenser means and the evaporator means whereby heat is lost from the pressurized refrigerant to said heat exchange medium in the condenser means and heat is absorbed from said solution to the evaporating refrigerant in the evaporator means when the pressurized refrigerant is communicated with the condenser means thereby lowering the temperature of said solution and whereby heat is lost from the pressurized refrigerant to said solution in the evaporator means and heat is absorbed from said heat exchange medium to the evaporating refrigerant in the condenser means when the pressurized refrigerant is communicated with the evaporator means thereby raising the temperature of said solution, said refrigerant compressing means including a reversible heat pump, a reversible electric motor for driving said heat pump, a reversing switch for operating said motor, and means immersed in said solution for controlling operation of said switch thereby retaining the temperature of said solution at substantially a constant level, said condensing and evaporating means including an inverted U-shaped member of hollow construction having spaced parallel leg portions adapted to be disposed on opposite sides of a partition separating said solution from said heat exchange medium, each of said leg portions having a plurality of heat exchange coils therein thereby forming an evaporator and condenser, whereby the relationship of the condenser and evaporator is reversed when the heat pump is reversed.

3. A temperature control system comprising an enlarged water bath tank, a solution tank disposed in said water bath tank for receiving a liquid solution, a first heat exchange plate immersed in the solution in the solution tank, a second heat exchange plate immersed in the water in the water bath tank, an expansion device between said plates, a reversible compressor, a first conduit intercommunicating one side of said compressor with said first plate, a second conduit intercommunicating the other side of the compressor with the second plate, means for operating said compressor in a selective direction for selectively absorbing heat from the solution and emitting heat to the water or absorbing heat from the water and emitting heat to the solution for retaining the temperature of the solution at substantially a constant level.

4. A temperature control system comprising an enlarged water bath tank, an insert tank disposed in said water bath tank for receiving a liquid solution, a first heat exchange plate immersed in the solution in the insert tank, a second heat exchange plate immersed in the water in the water bath tank, an expansion device between said plates, a reversible compressor, a first conduit intercommunicating one side of said compressor with said first plate, a second conduit intercommunicating the other side of the compressor with the second plate, means for operating said compressor in a selective direction for selectively absorbing heat from the solution and emitting heat to the water or absorbing heat from the water and emitting heat to the solution for retaining the solution at substantially a constant level, said first and second conduits extending downwardly into the plates and terminating in spaced relation to the bottom thereof.

5. A temperature control system comprising an enlarged water bath tank, an insert tank disposed in said water bath tank for receiving a liquid solution, a first heat exchange plate immersed in the solution in the insert tank, a second heat exchange plate immersed in the water in the water bath tank, an expansion device interconnecting the upper ends of said plates, a reversible compressor, a first conduit intercommunicating one side of said compressor with said first plate, a second conduit intercommunicating the other side of the compressor with the second plate, means for operating said compressor in a selective direction for selectively absorbing heat from the solution and emitting heat to the water or absorbing heat from the water and emitting heat to the solution for retaining the solution at substantially a constant level, said compressor operating means being responsive to the temperature of the solution, and overlapping means to assure operation of said compressor in a single direction at any given time.

6. A temperature control system comprising an enlarged water bath tank, an insert tank disposed in said water bath tank for receiving a liquid solution, a first heat exchange plate immersed in the solution in the insert tank, a second heat exchange plate immersed in the water in the water bath tank, an expansion device interconnecting the upper ends of said plates, a reversible compressor, a first conduit intercommunicating one side of said compressor with said first plate, a second conduit intercommunicating the other side of the compressor with the second plate, means for operating said compressor in a selective direction for selectively absorbing heat from the solution and emitting heat to the water or absorbing heat from the water and emitting heat to the solution for retaining the solution at substantially a constant level, said plates being in the form of inner and outer embossed plate coils with the inner plate forming the insert tank for the solution, and a divider plate insulating the inner plate from the outer plate.

7. A temperature control system comprising an enlarged water bath tank, and insert tank disposed in said water bath tank for receiving a liquid solution, a first heat exchange plate immersed in the solution in the insert tank, a second heat exchange plate immersed in the water in the water bath tank, an expansion device interconnecting the upper ends of said plates, a reversible compressor, a first conduit intercommunicating one side of said compressor with said first plate, a second conduit intercommunicating the other side of the compressor with the second plate, means for operating said compressor in a selective direction for selectively absorbing heat from the solution and emitting heat to the water or absorbing heat from the water and emitting heat to the solution for retaining the solution at substantially a constant level, said first and second conduits extending downwardly into the plates and terminating in spaced relation to the bottom thereof, an expansion valve on each conduit at the upper end of each plate, and a tube extending from each plate to the opposite expansion valve thereby forming the interconnecting expansion means between the inner and outer plates.

8. In a heat exchange system including a solution to be maintained at a constant temperature level and a heat exchange medium for absorbing heat from said solution when the temperature of said solution rises above the desired temperature level and for losing heat to said solution when the temperature of said solution falls below the desired temperature level, a temperature control device comprising a first heat exchange plate, a second heat exchange plate, a refrigerant expansion device intercommunicating the first and second plates, a conduit connected to each of said plates, a reversible compressor interconnecting said conduits whereby the flow of refrigerant through the system may be reversed by reversing said compressor, said plates being disposed in adjacent relation with the expansion device discharging refrigerant in remote relation to the point of connection between the conduit and plate, each of said plates having spaced inner and outer walls with the refrigerant received in the area between the plates, said plates being disposed in parallel relation with upper edges being interconnected thereby forming an inverted U-shaped assembly for engagement over the upper edge of a partition separating said solution from said heat exchange medium with the first plate immersed in said solution and the second plate immersed in said heat exchange medium whereby the first and second plates function as an evaporator or condenser respectively for removing heat or adding heat to said solution thereby maintaining said solution at a predetermined temperature by reversing said compressor, and means responsive to the temperature of said solution for controlling operation of the compressor.

9. The combination of claim 8 wherein said compressor is electrically driven and said control means includes a heat bulb immersed in said solution, a reversing switch connected to said heat bulb for operating the compressor in selective direction in accordance with the temperature of said solution, and overlap means providing delay between the directions of operation of the compressor.

10. In a heat exchange system including a solution to be maintained at a constant temperature level and a heat exchange medium for absorbing heat from said solution when the temperature of said solution rises above the desired temperature level and for losing heat to said solution when the temperature of said solution falls below the desired temperature level, a heat exchange device employed in a film processing system with said solution being disposed in a solution tank, said heat exchange medium being in the form of water disposed in a water bath tank separated from the solution tank by a partition wall, said device comprising an inverted U-shaped assembly supported on the partition wall with legs thereof immersed in said solution and water respectively, each leg of said assembly including spaced parallel plates, a capillary tube intercommunicating the upper ends of the legs of the U-shaped assembly, said tube terminating in adjacent spaced relation to the bottom of the plates, a conduit communicating with the upper end of each leg of the inverted U-shaped assembly, and compressor means communicating with said conduits for providing selective flow of refrigerant to and from the legs of the assembly whereby heat exchange between the refrigerant and the solution and heat exchange water takes between the refrigerant and the plate throughout the surface area of the parallel plates.

11. A temperature control system comprising a heat exchange medium containing means, a solution containing means isolated from said heat exchange medium containing means, a first heat exchange plate disposed in the solution containing means and immersed in the solution, a second heat exchanger plate disposed in the heat exchange medium containing means and immersed in the heat exchange medium, an expansion device intercommunicating said plates, a pressurized refrigerant supply means selectively supplying the heat exchanger plates with pressurized refrigerant selectively absorbing heat from the solution and emitting heat to the heat exchange medium or absorbing heat from the heat exchange medium and emitting heat to the solution thereby maintaining the temperature of the solution at substantially a constant level, and means controlling the supply means for directing the flow of the pressurized refrigerant to the heat exchange plates.

References Cited in the file of this patent

UNITED STATES PATENTS

| | | |
|---|---|---|
| 1,492,512 | Drinkwater | Apr. 29, 1924 |
| 1,969,187 | Schutt | Aug. 7, 1934 |
| 2,342,174 | Wolfert | Feb. 22, 1944 |
| 2,364,016 | Wussow et al. | Nov. 28, 1944 |
| 2,414,339 | Skaggs et al. | Jan. 14, 1947 |
| 2,581,744 | Zimmerman | Jan. 8, 1952 |